(12) United States Patent
Webb

(10) Patent No.: US 8,416,010 B2
(45) Date of Patent: Apr. 9, 2013

(54) ADAPTIVE CHARGE PUMP

(75) Inventor: Robert W. Webb, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 180 days.

(21) Appl. No.: 13/162,990

(22) Filed: Jun. 17, 2011

(65) Prior Publication Data

US 2012/0274392 A1 Nov. 1, 2012

Related U.S. Application Data

(60) Provisional application No. 61/479,733, filed on Apr. 27, 2011.

(51) Int. Cl.
*G05F 1/10* (2006.01)
(52) U.S. Cl.
USPC .......................................................... 327/536
(58) Field of Classification Search .................. 327/535, 327/536, 537
See application file for complete search history.

(56) References Cited

U.S. PATENT DOCUMENTS

| | | | | |
|---|---|---|---|---|
| 5,852,552 | A | * | 12/1998 | Kwon ............................... 363/60 |
| 6,177,828 | B1 | * | 1/2001 | Kang et al. ..................... 327/536 |
| 6,208,196 | B1 | * | 3/2001 | St. Pierre ....................... 327/536 |
| 7,760,010 | B2 | * | 7/2010 | Gebara et al. .................. 327/536 |

* cited by examiner

*Primary Examiner* — Jeffrey Zweizig
(74) *Attorney, Agent, or Firm* — Gary Stanford

(57) ABSTRACT

A method of adaptively controlling a charge pump including coupling the charge pump to a control node, toggling a clock input between supply voltage levels to charge an a charge pump output, monitoring the charge pump output, maintaining the control node at a supply voltage level when a supply voltage magnitude does not exceed a threshold level, and adjusting the control node to maintain the charge pump output at a limit level when the supply voltage magnitude exceeds the threshold level. A positive charge pump embodiment charges the output to twice the positive supply voltage up to no more than a limit level. A negative charge pump embodiment charges the output to the same magnitude with opposite polarity as the positive supply voltage, and decreases the output magnitude if the positive supply voltage is above the threshold level. A Zener diode and controlled current mirror may be used for control.

20 Claims, 6 Drawing Sheets

ADAPTIVE CHARGE PUMP

CROSS-REFERENCE TO RELATED APPLICATIONS

This application claims the benefit of U.S. Provisional Application Ser. No. 61/479,733, filed on Apr. 27, 2011, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

Figure 1:
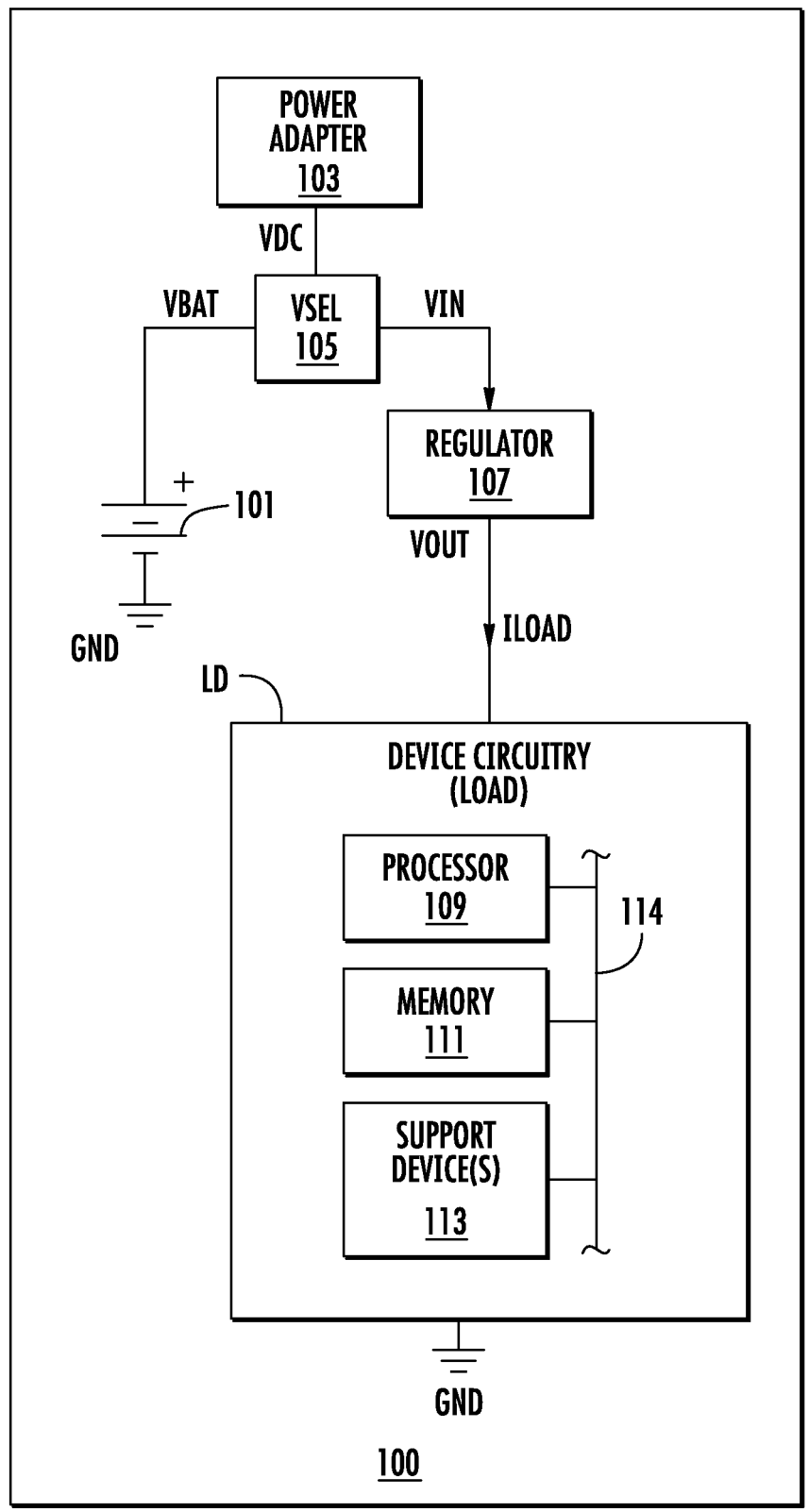
FIG. 1 is a block diagram of an electronic device including a DC-DC switching voltage regulator providing a regulated output voltage to a load.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

It is often desired to operate a complementary metal-oxide semiconductor (CMOS) integrated circuit (IC) over a wide range of power supply voltages. For example, a CMOS chip may receive a supply voltage which ranges anywhere from a minimum level of 1.8 Volts (V) to a maximum or limit voltage level of 5.5V, in which the upper limit voltage range (e.g., 5.5V) is determined by the voltage limitation of the process used to fabricate the IC. It is also common that a larger operating voltage range is desired at the lower levels of the source voltage range than is provided by the input supply voltage. When a voltage level or voltage range greater than the supplied source voltage is desired, a charge pump or the like is incorporated into the design of the IC to increase the total supply voltage available.

An increase in the supply voltage range is done, for example, in cases in which it is desired to increase the dynamic operating range of a device, such as an amplifier or the like. A charge pump may be used to charge a positive voltage rail above the voltage level of the positive supply voltage. This is also done in cases in which, for example, a single positive power supply rail is supplied, but operation below ground is desired, in which case the charge pump generates a negative supply rail. The negative supply rail is typically at a potential below ground, and slightly less, in magnitude, than the supplied rail voltage.

With commonly used charge pump configurations, the positive/negative rail voltage becomes more positive/negative at the same rate that the supplied positive rail voltage is increased. The practical limit of this occurs when the total voltage range between the internally generated positive rail voltage and the externally applied ground or reference level reaches the maximum allowed by the process. Alternatively, or in addition, the practical limit occurs when the total voltage range between the internally generated negative rail voltage and the externally applied positive rail voltage reaches the maximum allowed by the process.

It would be desirable for the voltage generated by the charge pump to decrease in magnitude at the same rate as the externally applied voltage increases beyond the process limitation point, in order to ensure that the total supply voltage range between an internally generated voltage rail and either one or both of the supply voltages does not exceed the process limit. A means by which to modify an existing charge pump circuit to accomplish this is the subject of this disclosure.

FIG. 1 is a block diagram of an electronic device 100 including a DC-DC switching voltage regulator 107 (otherwise referred to as a converter or power supply or the like) providing a regulated output voltage VOUT. The electronic device 100 is shown including a battery 101 providing a battery voltage VBAT to one input of a voltage select (VSEL) circuit 105, having another input receiving a DC voltage (VDC) from a power adapter 103. The power adapter 103 receives AC or DC voltage from an external power source, such as an alternating current (AC) source (not shown), and converts the received voltage to the VDC voltage. If the battery 101 is rechargeable, then the power adapter 103 may include a battery charger for charging the battery 101 or a separate battery charger (not shown) may be included. The VSEL circuit 105 provides an input voltage VIN to an input of the voltage regulator 107. The voltage regulator 107 has an output providing the output voltage VOUT, which is used to provide source voltage to a load LD.

The load LD generally includes the circuitry of the electronic device 100, which receives a load current ILOAD. As shown, the LD may include many devices, such as, for a non-exhaustive list of possible devices, a processor 109, a memory 111, and one or more other support device(s) 113 coupled together via an appropriate interface 114, such as a bus or the like. Each of the devices receive supply voltage from the regulator 107 (e.g., VOUT) relative to a reference voltage level, such as GND. Other types of electronic devices that do not have a processor or memory are also contemplated.

The electronic device 100 may be any type of electronic device, including mobile, portable, or handheld devices, such as, for example, any type of personal digital assistant (PDA), personal computer (PC), portable computer, laptop computer, etc., cellular phone, personal media device, etc. In an alternative embodiment, the electronic device 100 is not battery-powered and is powered by an AC source or other source of power. In general, the voltage regulator 107 is configured as a power regulator for computer, industrial, consumer, etc., applications and/or battery-powered applications.

The primary functions of the electronic device 100 are performed by the load LD which is the device circuitry in the illustrated configuration. In one embodiment the battery 101 is a rechargeable battery of any suitable type, although non-rechargeable batteries are contemplated. In various embodiments the voltage of VIN is below VOUT for a boost configuration, VIN is above VOUT for a buck configuration, or VIN relative to VOUT may range anywhere between for various other configurations, such as, for example, a single-ended, primary-inductor converter (SEPIC) or buck-boost converts or the like.

Power consumption and efficiency is of utmost importance in portable and/or battery-powered applications. It is desired, for example, that the load LD be configured as efficiently as possible to minimize ILOAD (and corresponding power consumption) while maintaining proper operation for the desired operating parameters or modes. VOUT and/or other supply voltages may have a specified value which is limited to achieve desired power efficiency. Nonetheless, it may be desired to operate any one or more of the devices within the load LD, such as the processor 109 and one or more of the support device(s) 113, within an extended voltage range greater than that provided by VOUT and GND. A charge pump or the like is typically provided internal to an IC to achieve the desired voltage range.

In certain electronic devices, the voltage of VOUT relative to GND is sufficiently low to enable a device within the load LD to operate in an extended voltage range without violating voltage process limits. In that case, it is desired that the charge pump drive an internal voltage rail to a desired increased voltage level. In other electronic devices, although the voltage range between VOUT and GND may be within the voltage process limits of devices of the load LD, the internal extended voltage range may otherwise exceed the voltage process limits for that device. In that case, it is desired that the voltage generated by any internally provided charge pump decrease in magnitude based on the externally applied voltage so that the total supply voltage range not exceed the process limit.

In other words, it is desired that an IC device be capable of generating a maximal allowable internal voltage level without exceeding the process limits for that device. An adaptive charge pump as described herein provides this useful function.

Figure 2:
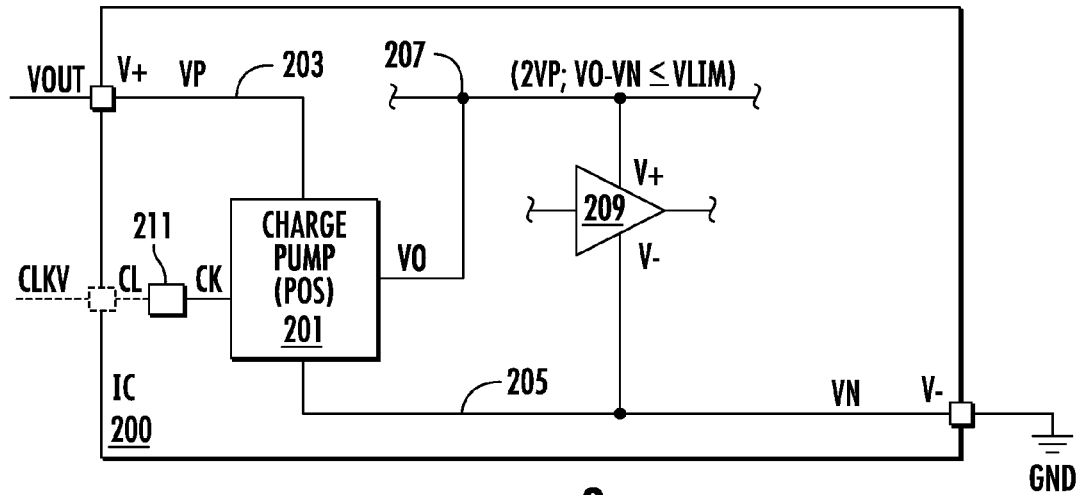
FIG. 2 is a simplified block diagram of an IC including a positive adaptive charge pump implemented according to one embodiment.

FIG. 2 is a simplified block diagram of an IC 200 including a positive adaptive charge pump 201 implemented according to one embodiment. The IC 200 includes power supply pins V+ and V− coupled to the supply voltages VOUT and GND, respectively. The voltage applied to supply input pin V+ (e.g., VOUT) is internally routed via conductive path 203 as a positive voltage VP to a positive input of the charge pump 201. The voltage applied to supply input pin V− (e.g., GND) is internally routed via conductive path 205 as a negative (or reference) voltage VN to a negative input of the charge pump 201. A clock signal CK is shown provided by a clock circuit 211 to another input of the adaptive charge pump 201. In one embodiment, the clock circuit 211 is an oscillator circuit or the like for generating CK on the IC 200. Alternatively, the clock circuit 211 distributes or otherwise develops CK from an external clock source, such as an external clock signal CLK received by a clock pin CL or the like. The IC 200 includes at least one device which operates with an extended voltage range that is greater than the difference between GND and VOUT without otherwise violating process limits for the IC 200. As shown, for example, the IC 200 includes an amplifier 209 having positive (V+) and negative (V−) supply voltage terminals intended to operate within as large a dynamic voltage range as possible. The adaptive charge pump 201 receives VP and VN and provides an output voltage VO which has a magnitude which may be up to about twice that of VP (2VP). The output of the adaptive charge pump 201 is coupled to a positive voltage rail 207. In this case VN is provided to the V− supply terminal of the amplifier 209, and the positive voltage rail 207 is coupled to the V+ supply terminal of the amplifier 209.

When the voltage supply range between VOUT and GND is sufficiently low, the adaptive charge pump 201 operates to increase the dynamic operating voltage range of the amplifier 209, such as by increasing the voltage level of VO up to about twice the voltage level of VP, or 2VP. The CK signal is toggled at a suitable frequency to drive operation of the adaptive charge pump 201 as further described below. If the voltage supply range is increased above a threshold level (VTH) which might otherwise cause the difference between 2VP and VN (or GND) to exceed process limits, then the adaptive charge pump 201 limits the voltage level of VO accordingly. In one embodiment, the process voltage limit relative to VN is VLIM. As shown, VO has a voltage of about 2VP, limited by VLIM such that VO−VN≦VLIM. Assuming VN is about zero Volts (0V) and VTH is about one-half of VLIM, when VP is below VTH, VO is 2VP, and when VP is at or above VTH, VO is at VLIM. Thus, the adaptive charge pump 201 is a positive adaptive voltage pump which increases the voltage level of the positive voltage rail 207 as much as possible without exceeding the process limits of the IC 200.

Figure 3:
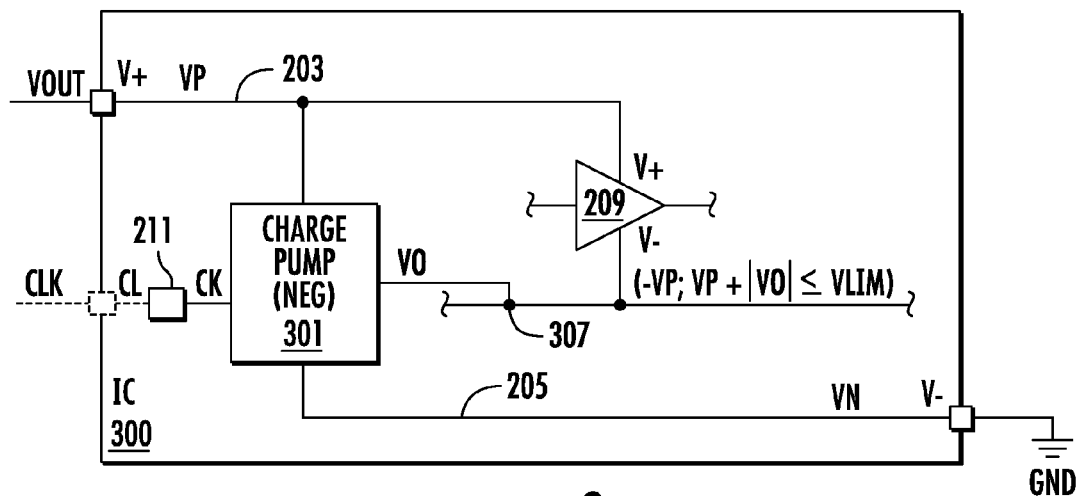
FIG. 3 is a simplified block diagram of an IC including a negative adaptive charge pump implemented according to one embodiment.

FIG. 3 is a simplified block diagram of an IC 300 including a negative adaptive charge pump 301 implemented according to one embodiment. The IC 300 also includes power supply pins V+ and V− receiving the supply voltages VOUT and GND, respectively. The voltage applied to supply input pin V+ (e.g., VOUT) is internally routed via conductive path 203 as a positive voltage VP to a positive input of the charge pump 301. The voltage applied to supply input pin V− (e.g., GND) is internally routed via conductive path 205 as a negative (or reference) voltage VN to a negative input of the charge pump 301. The clock signal CK is shown provided by the clock circuit 211 to another input of the adaptive charge pump 201. Again, the clock circuit 211 may be an oscillator circuit or the like for generating CK on the IC 300, or may simply develop or distribute CK based on an external clock source in similar manner as previously described of the IC 200. The IC 300 includes at least one device which operates with an extended voltage range which is greater than the difference between GND and VOUT without otherwise violating process limits for the IC 300. As shown, for example, the IC 300 includes the amplifier 209 having positive (V+) and negative (V−) supply voltage terminals intended to operate within as large a dynamic voltage range as possible.

The adaptive charge pump 301 receives VP and VN and provides the output voltage VO. In this case, the voltage level of VO has about the same magnitude as VP (but with opposite polarity) so that VO is equal to −VP while VP is less than or equal to the threshold voltage level VTH (half of VLIM). When VP is at or above VTH, then the sum of VP plus the magnitude of VO remains at VLIM, or VP+|VO|≦VLIM. The output of the adaptive charge pump 301 providing VO is coupled to a negative voltage rail 307. In this case VP is provided to the V+ supply terminal of the amplifier 209, and the negative voltage rail 307 is coupled to the V− supply terminal of the amplifier 209.

When the voltage supply range between VOUT and GND is sufficiently low, the adaptive charge pump 301 operates to increase the dynamic operating voltage range of the amplifier 209, such as by increasing the magnitude of VO to follow the magnitude as VP (e.g., −VP) so that the difference between VP and VO is up to about twice that of the voltage supply range between VOUT and GND (VP−[−VP]=2VP). The CK signal is toggled at a suitable frequency to drive operation of the adaptive charge pump 301 in a similar manner as for the adaptive charge pump 201. If VP is increased above the threshold level VTH which might otherwise cause the difference between VP and VO to exceed process limits represented by VLIM, then the adaptive charge pump 301 controls the magnitude of VO accordingly to maintain the voltage difference between VP and VO at VLIM. Thus, the adaptive charge pump 301 is a negative adaptive voltage pump which increases the magnitude of the negative voltage rail 307 as much as possible without exceeding the process limits of the IC 300.

Figure 4:
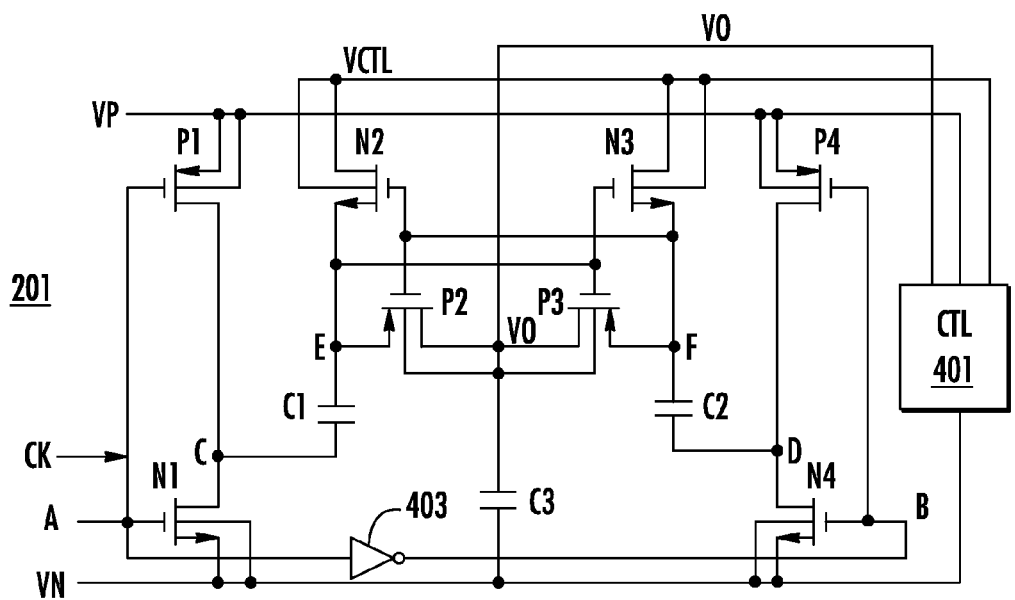
FIG. 4 is a schematic and block diagram of the positive adaptive charge pump of FIG. 2 according to one embodiment.

FIG. 4 is a schematic and block diagram of the positive adaptive charge pump 201 according to one embodiment. Node A is coupled to the gates of a P-channel transistor P1 and an N-channel transistor N1. The transistor devices are shown as metal-oxide semiconductor (MOS) transistors or field-effect transistors (FETs) or the like according to CMOS technology. Alternative transistor types may be used depending upon the particular implementation of the integrated process. The source and body of P1 are coupled to positive supply voltage VP and its drain is coupled to a node C, which is further coupled to the drain of N1. The source and body of N1 are coupled to the negative supply voltage VN. Node A is coupled to an input of an inverter 403, having an output coupled to a node B. Node B is coupled to the gates of another P-channel transistor P4 and another N-channel transistor N4. The source and body of P4 are coupled to positive supply voltage VP and its drain is coupled to a node D, which is further coupled to the drain of N4. The source and body of N4 are coupled to VN.

The drain and body terminals or junctions of a pair of N-channel transistors N2 and N3 are each coupled to a control node VCTL. The source of N2 is coupled to a node E, which is further coupled to the source of P-channel transistor P2 and to one end of a capacitor C1. The source of N3 is coupled to a node F, which is further coupled to the source of P-channel transistor P3 and to one end of another capacitor C2. The gate of N2 and the gate of P2 are both coupled to node F, and the gate of N3 and the gate of P3 are both coupled to the node E. The other end of C1 is coupled to node C and the other end of C2 is coupled to node D. The drain and body of each of P2 and P3 are coupled together at an output node VO, which is further coupled to one end of another capacitor C3. The other end of C3 is coupled to VN. A controller 401 is coupled between VN and VP, and is further coupled to VCTL and VO. The CK signal is shown driving node A, in which CK toggles between the voltage levels of VN and VP. VO is the output of the positive adaptive charge pump 201.

Figure 5:
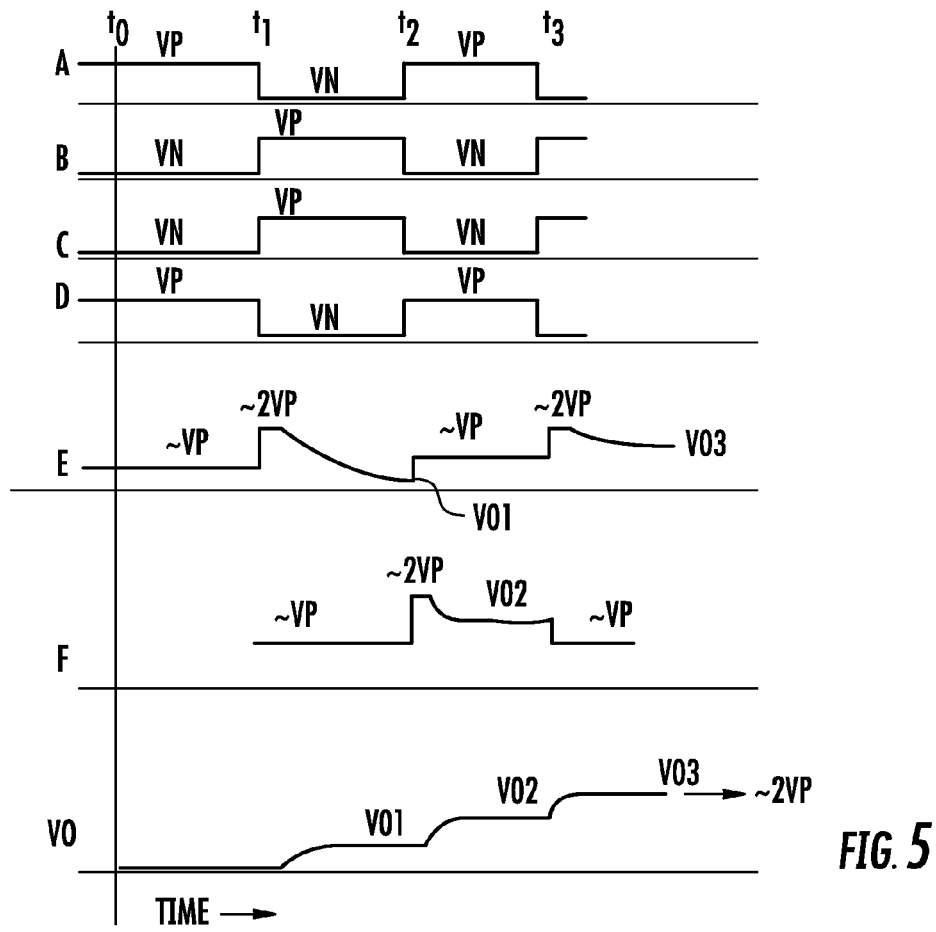
FIG. 5 is a timing diagram plotting voltages of various nodes versus time for illustrating operation of the positive adaptive charge pump of FIG. 4.

FIG. 5 is a timing diagram plotting voltages of the nodes A, B, C, D, E, F, and VO versus time for illustrating operation of the positive adaptive charge pump 201. The supply voltage range between VP and VN is sufficiently low below the process voltage limitation threshold to allow an extended voltage range, and output VO is unloaded. In this case, normal operation means that the controller 401 holds VCTL at about the same level as VP. The CK signal toggles node A as previously described between VN and VP. At an initial time t0, node A is driven high to VP by CK, turning N1 on and P1 off so that node C is pulled low to VN. The inverter 403 drives node B low to VN at time t0, turning P4 on and N4 off so that node D is pulled high to VP. P1 and N1 collectively form an inverter, so that node C toggles between VN and VP to opposite states as that of node A, ignoring small timing delays between the nodes. Similarly, P4 and N4 collectively form an inverter, so that node D toggles between VN and VP to opposite states as that of node B, ignoring small timing delays between the nodes. Thus, as shown, when A goes low at time t1, B and C both go high and D goes low; when A goes back high at time t2, B and C both go low and D goes high; and when A goes back low at time t3, B and C both go high and D goes low. Operation repeats in this manner while CK toggles node A.

After time t0, the capacitor C1 charges through the body-source junction of N2 and the drain-source path of N1 to a voltage of about VP (shown as ~VP, which is slightly less than VP in this case), as reflected by the voltage of node E. The voltage of node F is indeterminate, and VO is at a low voltage level indicating that capacitor C3 is initially discharged. At subsequent time t1, nodes A-D change state in which node C goes high to VP. The charge of C1 momentarily drives node E above VP to about twice VP, shown as ~2VP. Since node B goes high to VP turning P4 off and N4 on, node F is driven to about VP, shown as ~VP. Since D is at VN, the capacitor C2 charges to about VP, or ~VP. The combination of voltages on nodes E and F turn P2 on causing C1 to partially discharge into C3. C3 charges between t1 and t2 to a voltage V01, which is generally about one-half of VP (VP/2).

At time t2, each of nodes A-D change state again (e.g., in response to CK signal), so that D goes high to about VP and the charge on C2 raises node F to nearly twice VP, or ~2VP. N2 is turned on hard, which charges C1 fully to VP. P3 turns on, and C2 partially discharges into C3 raising output node VO to a higher voltage level, shown as V02. This process continues as the nodes A-D change state in response to CK until output VO is charged to voltage V03 and so on up to a maximum level of about 2VP.

The situation often arises in which a circuit or IC, such as the ICs 200 and/or 300, is applied in a variety of circumstances with different values of VOUT. For example, a given physical IC may be exposed to a range of supply voltages in a given electronic device, such as for different modes of operation in which VOUT is adjusted between minimum and maximum values for different modes of operation. Alternatively, a first IC according to a given design may be placed into a first device which uses a low voltage level for VOUT, whereas a second IC implemented according to the same design may be placed into a second device which uses a higher voltage level for VOUT. The ICs 200 and 300 both have a process breakdown limitation which limits the voltage differential applied across the IC or any component within the IC. If the voltage differential exceeds the process breakdown limitation, the IC may be damaged or fail to operate properly. Since each IC 200 and 300 generates an internal voltage resulting in a voltage differential which is about twice that of the source voltage difference between VOUT and GND, then if VOUT exceeds about one-half of the process breakdown limitation, then the magnitude of the internally generated voltage at VO of 2VP (positive adaptive charge pump 201) or −VP (negative adaptive charge pump 301) is reduced or limited to avoid violation of the process breakdown limitation.

Consider, for example, a specific case in which VOUT is expected to range between about 1.8V and 5.5V in which the process breakdown limitation, or VLIM, is just higher than about 5.5V. When VOUT is at or below a threshold voltage level of about one-half of VLIM, or about VTH=2.75V, then the positive adaptive charge pump 201 or the negative adaptive charge pump 301 may operate to drive the voltage rail 207 or the voltage rail 307 to the maximum voltage level, or to about 2VP or −VP. When, however, VOUT is above VTH, then the voltage level of the voltage rail 207 or 307 is limited or otherwise reduced to avoid a voltage differential greater than VLIM (e.g., VO−VN>VLIM). When VOUT is at 5.5V, then VO within the IC 200 would otherwise be driven to about 2×5.5V=11V. Similarly, when VOUT is at 5.5V (and VP is 5.5V), then VO would otherwise be driven to about −5.5V, so that the difference between VP and VO (−VP) is about 11V.

The controller 401 of the adaptive charge pump 201 of the IC 200 is configured to avoid this undesirable situation by controlling the voltage level of VCTL to limit the voltage level of output VO driving the voltage level of the positive voltage rail 207. In particular, when the difference between VP and VN is less than or equal to VTH, the controller 401 effectively clamps VCTL to VP so that VO is charged up to a voltage level of about twice that of VP. However, when the difference between VP and VN is above VTH, the controller 401 controls VCTL in order to limit the voltage level of VO so that the difference between VO and VN has a maximum level of about VLIM.

The negative adaptive charge pump 301 of the IC 300 operates in a similar manner by controlling the voltage level of VCTL to limit the voltage level of VO driving the voltage level of the negative voltage rail 307. In this case, when VP is at or below VTH, then VO is driven to a negative version of VP with the opposite magnitude, or −VP. When VP is above VTH, the magnitude of VO is decreased so that the difference between VP and VO is maintained at about VLIM to avoid violating maximum process limits.

Figure 6:
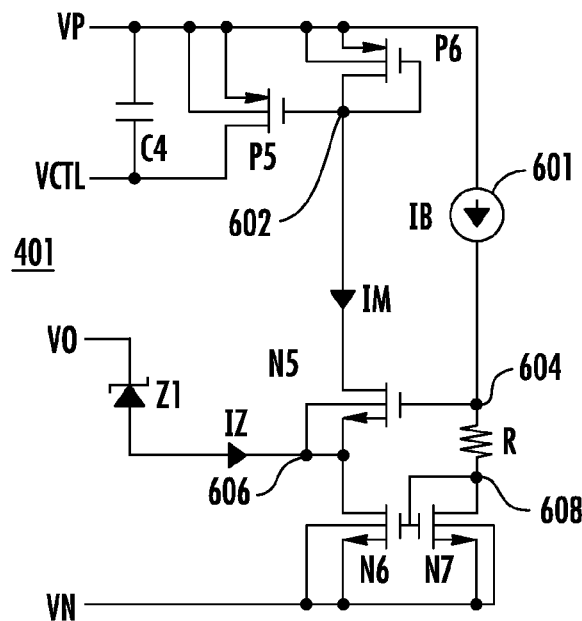
FIG. 6 is a schematic diagram of the controller of FIG. 4 according to one embodiment.

FIG. 6 is a schematic diagram of the controller 401 according to one embodiment. A Zener diode Z1 has its cathode coupled to VO and its anode coupled to a node 606. A pair of P-channel transistors P5 and P6 each have their body and source coupled to VP. P6 is diode-coupled having its gate coupled to its drain at a node 602, which is further coupled to the gate of P5. The drain of P5 is coupled to VCTL, and a smoothing capacitor C4 is coupled between VP and VCTL. A current source 601 has a first terminal coupled to VP and a second terminal coupled to a node 604, in which the current source 601 develops a bias current IB from VP into node 604. An N-channel transistor N5 has its drain coupled to node 602, its gate coupled to node 604, and its body and source coupled together at node 606. A resistor R is coupled between node 604 and a node 608. An N-channel transistor N6 has its body and source coupled to VN and its drain coupled to node 606. Another N-channel transistor N7 has its body and source coupled to VN and its drain coupled to node 608. The gates of N6 and N7 are coupled together at node 608, such that N7 is effectively diode-coupled. A current IM flows from the drain of N5 into node 602. A current IZ flows from node 606 through Z1 to VO.

Z1 is configured to have a breakdown voltage of VLIM. The level of IB and the value of R are collectively configured to establish a voltage at node 604 to operate N5 so that the drain-source voltage of N6 exceeds its pinch-off voltage. In this manner, N6 is operated in its saturation mode. N6 and N7 are collectively configured as a current mirror, so that the current flowing through R, predominantly determined by IB, controls the level of the current flowing through the drain-source of N6. The relative sizes of N6 and N7 determine the amount of gain of the drain-source current of N6 relative to IB. In one embodiment, N6 and N7 are about equal in size so that the drain-source current of N6 is about the same as IB. In alternative embodiments, the relative sizes of N6 and N7 may be adjusted to adjust the drain-source current of N6 relative to IB. The current source 601, along with R1, N5, N6 and N7, collectively operate as a current-controlled current source, which effectively reproduces IB, or a fixed multiple of IB, as the drain-source current of N6. P5 is configured as a relatively large device as compared to P6. In one embodiment, for example, P5 is about 20 times the size of P6.

The configuration of the current-controlled current source results in the sum of the currents IZ and IM to be about equal to IB. When Z1 is turned off, IZ is zero or negligible so that IM is about equal to IB. When Z1 is turned on, IZ increases and IM decreases to maintain the sum of IM and IZ to be about IB, or IM+IZ≈IB.

Figure 7:
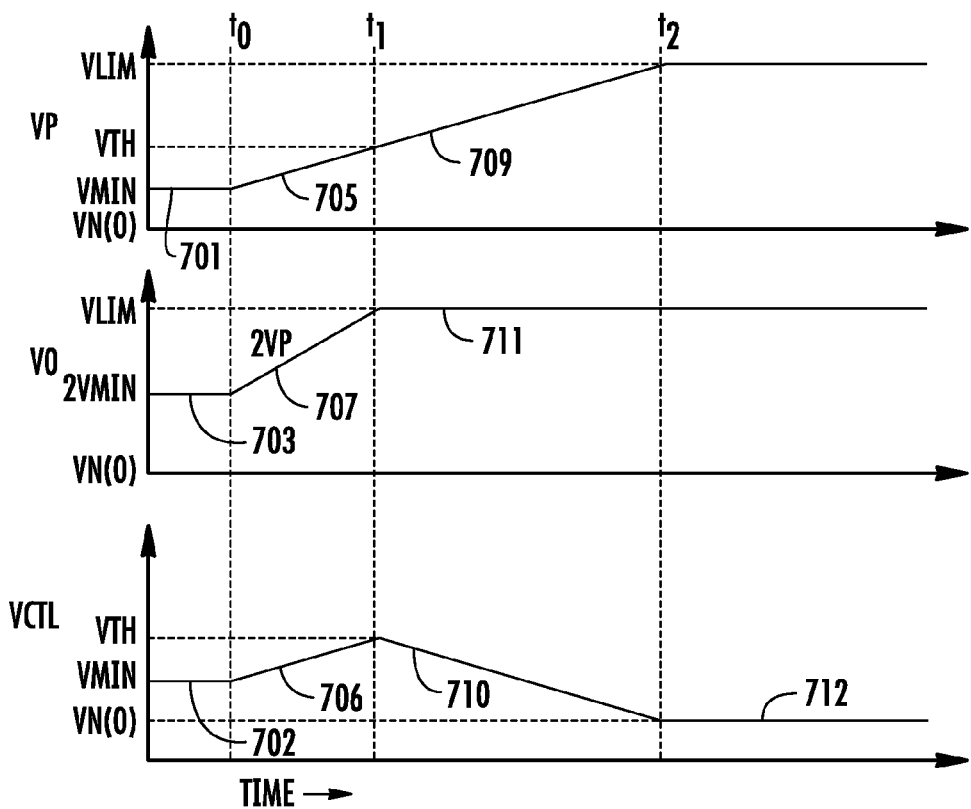
FIG. 7 is a plot of VP, G and VCTL versus time for the case in which VP is increased from a minimum level VMIN below VTH up to the maximum level VLIM to illustrate operation of the positive adaptive charge pump of FIG. 4 using the controller illustrated in FIG. 6.

FIG. 7 is a simplified plot of the voltages of VP, VO and VCTL versus time for the case in which VP is increased from a minimum level VMIN below VTH up to the maximum level VLIM to illustrate operation of the positive adaptive charge pump 201 using the controller 401 shown in FIG. 6. The plot is simplified in that small discrepancies or transitional variations are ignored. VN is a reference supply voltage assumed to be GND or about 0V. Up to an initial time t0, the voltage of VP is at VMIN as shown at 701. The voltage of VO is about twice that of VP, or about 2VMIN as shown at 703. Z1 is turned off during this condition, so that IZ is zero. The current IM through P6 establishes a gate-source voltage which is reflected as the gate-source voltage of P5. P5 is configured to provide an average value of the current drawn by the capacitors C1 and C2 with only a relatively small source-drain voltage, so that VCTL is effectively coupled to VP while Z1 is off. As shown, VCTL has a voltage of about VMIN as show at 702. In this manner, the controller 401 has little effect so that the adaptive charge pump 201 operates in a normal manner as previously described with reference to the timing diagram of FIG. 5.

VP is linearly increased as shown at 705 towards VTH. The voltage of VO rises at about twice the rate of VP to maintain its voltage at about 2VP as shown at 707 while VP is at or below VTH. The voltage of VCTL rises at about the same rate as VP as shown at 706. At time t1, VP reaches VTH, so that VO reaches VLIM and VCTL is still about the same as VP, which is VTH.

When the voltage of VP exceeds VTH after time t1 as shown at 709, then as the voltage of VO tends to exceed VLIM, Z1 conducts sourcing non-zero current IZ into node 606 thereby reducing the level of IM as a result of the fact that the drain-source current of N6 is constant due to the current-mirror configuration. The gate-source voltage of P6 is reduced thus reducing the gate-source voltage of P5, so that P5 sources less current from its drain to VCTL, which is used to provide current to C1 and C2 and thus ultimately to C3 during charge pump operation. The voltage level of VCTL is linearly reduced as shown at 710 while VP linearly increases, so that the voltage of VO remains limited to about VLIM as VP increases. VP reaches VLIM at time t2 and then is held at VLIM. VO remains relatively stable at about VLIM while VCTL ultimately settles at a minimum level.

The switching action of nodes A-D may be reflected on VCTL, in which capacitor C4 operates to smooth the voltage level of VCTL during operation.

Figure 8:
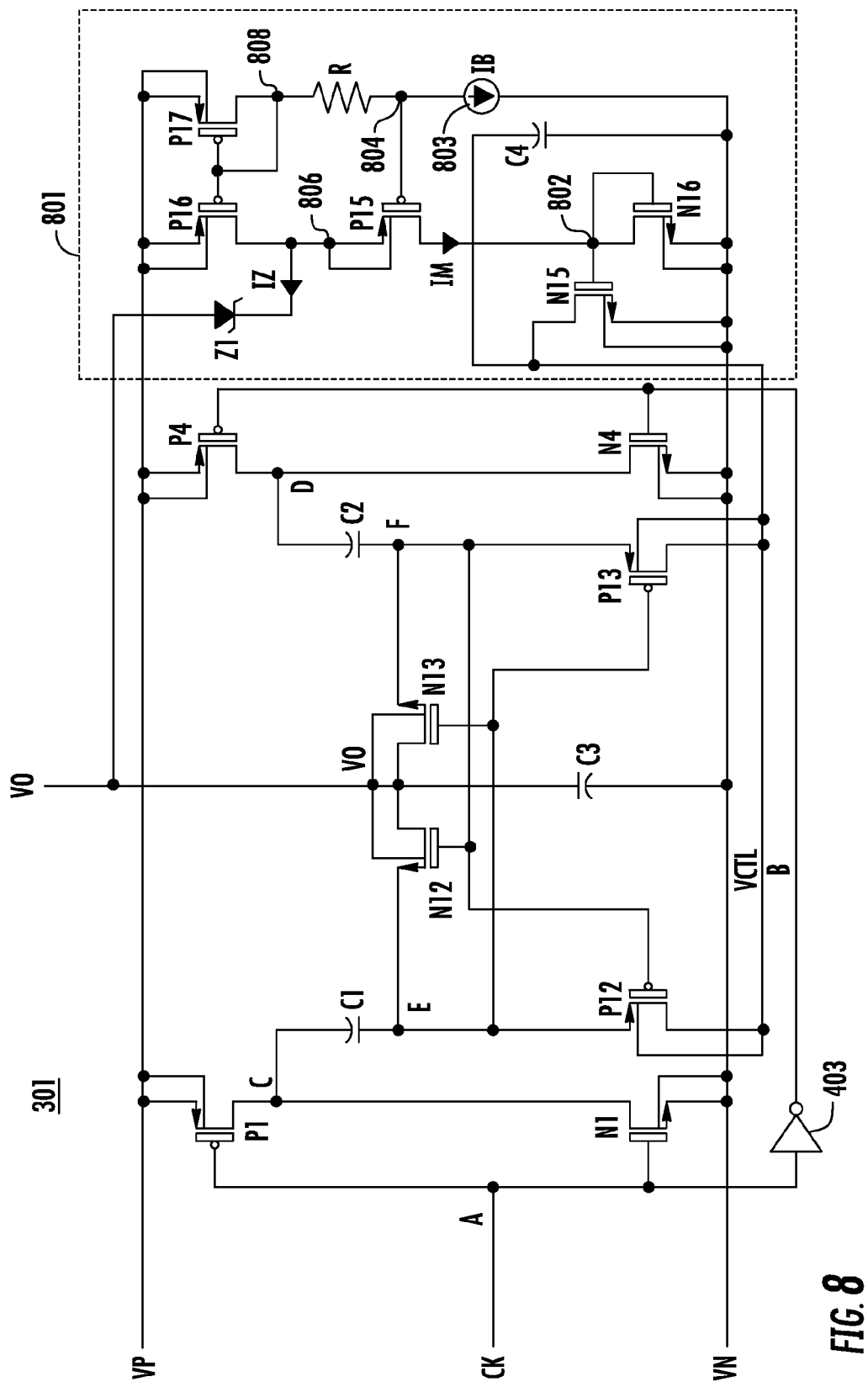
FIG. 8 is a schematic and block diagram of the negative adaptive charge pump of FIG. 3 according to one embodiment.

FIG. 8 is a schematic and block diagram of the negative adaptive charge pump 301 according to one embodiment. The negative adaptive charge pump 301 is configured in a similar manner as the positive adaptive charge pump 201 in which similar devices assume the same reference numerals. N1, N4, P1, P4 and the inverter 403 are configured and coupled in substantially the same manner between VP and VN forming nodes A, B, C and D in substantially the same manner. The CK signal is shown driving node A, in which CK toggles between the voltage levels of VN and VP in the same manner. Also, capacitor C1 is coupled between nodes C and E and capacitor C2 is coupled between nodes D and F in similar manner.

For the negative adaptive charge pump 301, the P-channel transistors P2 and P3 are replaced by corresponding N-channel transistors N12 and N13, respectively, and the N-channel transistors N2 and N3 are replaced by corresponding P-channel transistors P12 and P13, respectively. Node E is coupled to the source of N12, to the gate of N13, to the source of P12 and to the gate of P13. Node F is coupled to the source of N13, to the gate of N12, to the source of P13 and to the gate of P12. The drains and bodies of N12 and N13 are coupled together at output node VO, which is further coupled to one end of C3. The other end of C3 is coupled to VN. The drains and sources of P12 and P13 are coupled to VCTL.

The controller 401 is replaced by a controller 801, which is coupled between VN and VP, and which is further coupled to VCTL and VO. For the controller 801, the P-channel transistors P5 and P6 of the controller 401 are replaced by corresponding N-channel transistors N15 and N16, respectively, and the N-channel transistors N5-N7 of the controller 401 are each replaced by corresponding P-channel transistors P15, P16 and P17, respectively. The configuration is effectively flipped between VP and VN, in which Z1 is reversed having its anode coupled to VO and its cathode coupled to a node 806 (which corresponds with node 606). A current source 803 replaces current source 601 and provides a current IB from VN to a node 804. A current R is coupled between node 804 (which corresponds with node 604) and a node 808 (which corresponds with node 608). P16 and P17 have their sources and bodies coupled to VP, and their gates coupled together at node 808. The gate of P17 is coupled to its drain at node 808. The drain of P16 is coupled to node 806, which is further coupled to the gate and body of P15. The gate of P15 is coupled to node 804 and its drain is coupled to node 802 (which corresponds with node 602). The sources and bodies of N15 and N16 are coupled to VN. The drain of N15 is coupled to VCTL and to one end of C4. The gates of N15 and N16 and the drain of N16 are coupled together at node 802. The other end of C4 is coupled to VN. Current IM is shown flowing from node 802 into the drain of P15, and current IZ is shown flowing out of node 806 through Z1 to VO.

The configuration and operation of the controller 801 for the negative adaptive charge pump 301 is analogous to that of the controller 401 of the positive adaptive charge pump 201. Z1 is configured to have a breakdown voltage of VLIM. The level of IB and the value of R are collectively configured to establish a voltage at node 804 to operate P15 so that the drain-source voltage of P16 exceeds its pinch-off voltage. In this manner, P16 is operated in its saturation mode. P16 and P17 are collectively configured as a current mirror, so that the current flowing through R, predominately determined by IB, controls the level of the current flowing through the drain-source of P1N6. The relative sizes of P16 and P17 determine the amount of gain of the drain-source current of P16 relative to IB. In one embodiment, P16 and P17 are about equal in size so that the drain-source current of P16 is about the same as IB. In alternative embodiments, the relative sizes of P16 and P17 may be adjusted to adjust the drain-source current of P16 relative to IB. The current source 803, along with R1, P15, P16 and P17, collectively operate as a current-controlled current source, which effectively reproduces IB, or a fixed multiple of IB, as the drain-source current of P16. N15 is configured as a relatively large device as compared to N16. In one embodiment, for example, N15 is about 20 times the size of N16.

The configuration of the current-controlled current source results in the sum of the currents IZ and IM to be about equal to IB. When Z1 is turned off, IZ is zero or negligible so that IM is about equal to IB. When Z1 is turned on, IZ increases and IM decreases to maintain the sum of IM and IZ to be about IB, or IM+IZ≈IB.

Operation of the negative adaptive charge pump 301 is similar, except that node G is charged to the same magnitude with reversed polarity as VP while VP is equal to or less than VTH. When VP is above VTH, the magnitude of node G is reduced so that the difference between VP and node G remains at a maximum voltage difference of about VLIM. It is noted that if VP is at about VLIM, the node G goes to about 0V.

Figure 9:
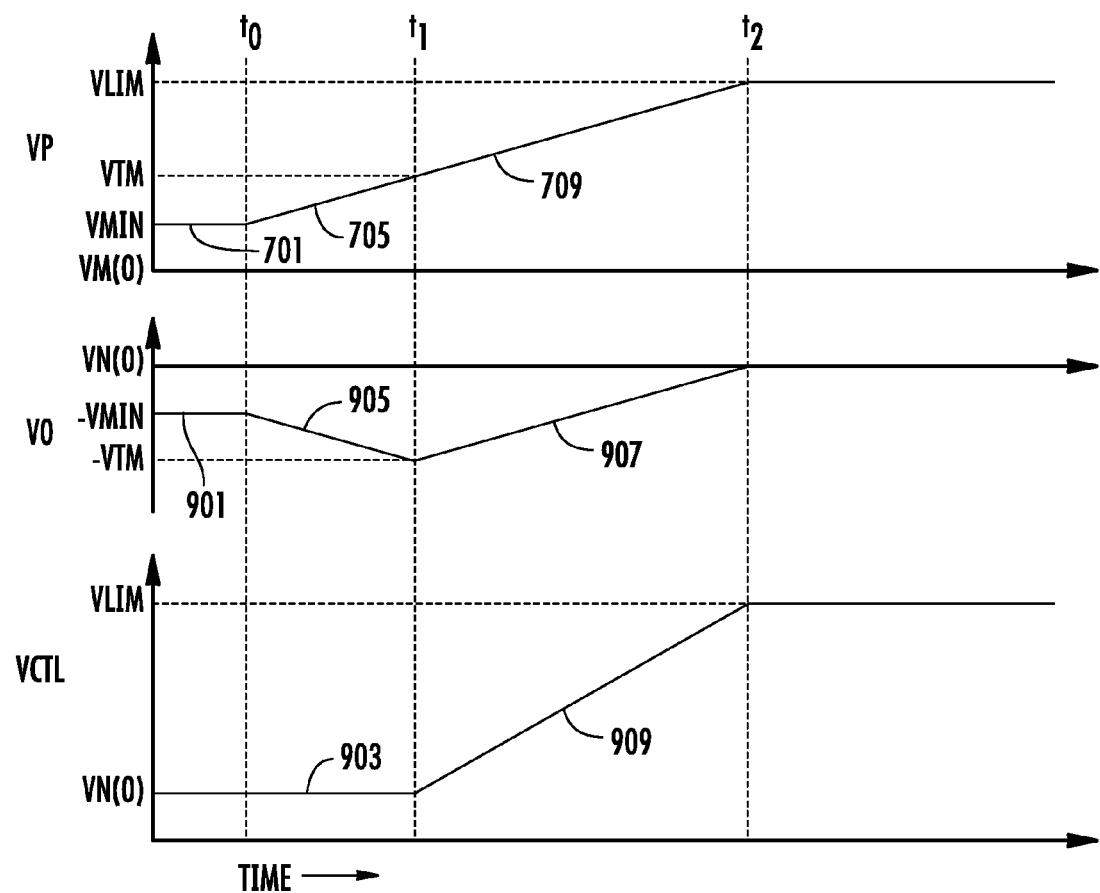
FIG. 9 is a simplified plot of the voltages of VP, VO and VCTL versus time for the case in which VP is increased from a minimum level VMIN below VTH up to the maximum level VLIM to illustrate operation of the negative adaptive charge pump of FIG. 8.

FIG. 9 is a simplified plot of the voltages of VP, VO and VCTL versus time for the case in which VP is increased from a minimum level VMIN below VTH up to the maximum level VLIM to illustrate operation of the negative adaptive charge pump 301 using the controller 801 shown in FIG. 8. The plot is simplified in that small discrepancies or transitional variations are ignored. VN is a reference supply voltage assumed to be GND or about 0V. Up to an initial time t0, the voltage of VP is at VMIN as shown at 701. The voltage of VO has about the same magnitude but opposite polarity as that of VP, or about −VMIN as shown at 901. Z1 is turned off during this condition, so that IZ is zero. The current IM through N16 establishes a gate-source voltage which is reflected as the gate-source voltage of N15. N15 is configured to provide an average value of the current drawn by the capacitors C1 and C2 with only a relatively small source-drain voltage, so that VCTL is effectively coupled to VN while Z1 is off. As shown, VCTL has a voltage of about zero as show at 903. In this manner, the controller 801 has little effect so that the negative adaptive charge pump 301 operates in a normal manner so that VO is about −VP.

VP is linearly increased as shown at 705 towards VTH. The voltage of VO decreases at about the same rate as VP rises to maintain its voltage at the same magnitude as VP but with opposite polarity (−VP) as shown at 905 while VP is at or below VTH. The voltage of VCTL remains at about zero as shown at 903. At time t1, VP reaches VTH, so that VO reaches −VTH with about the same magnitude and opposite polarity as VP.

When the voltage of VP exceeds VTH after time t1 as shown at 709, then as the voltage between VP and VO tends to exceed VLIM, Z1 conducts sourcing non-zero current IZ from node 806 thereby reducing the level of IM as a result of the fact that the drain-source current of P16 is constant due to the current-mirror configuration. The gate-source voltage of N16 is reduced thus reducing the gate-source voltage of N15, so that N15 sources less current from its drain to VCTL, which is used to provide current to C1 and C2 and thus ultimately to C3 during charge pump operation. The voltage level of VCTL is linearly increased as shown at 909 to about twice the amount that VP exceeds VTH, so that the voltage of VO increases by about the same amount as VP as shown at 907 to maintain the difference between VP and VO at about VLIM. VP reaches VLIM at time t2 and then is held at VLIM. After time t2 while VP is at VLIM, VO remains relatively stable at about zero while VCTL ultimately settles at about VLIM.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claims.

The invention claimed is:

1. An adaptive charge pump, comprising:
   first and second nodes which are toggled to opposite states between first and second supply voltages;
   a first capacitor coupled between said first node and a third node, a second capacitor coupled between said second node and a fourth node, and a third capacitor coupled between an output node and said second supply voltage;
   a first transistor of a first conductivity type having a first current terminal coupled to a control node, having a second current terminal coupled to said third node and having a control terminal coupled to said fourth node;
   a second transistor of said first conductivity type having a first current terminal coupled to said control node, having a second current terminal coupled to said fourth node and having a control terminal coupled to said third node;
   a third transistor of a second conductivity type having a first current terminal coupled to said third node, having a second current terminal coupled to said output node and having a control terminal coupled to said fourth node;
   a fourth transistor of said second conductivity type having a first current terminal coupled to said fourth node, having a second current terminal coupled to said output node and having a control terminal coupled to said third node; and
   a controller which controls said control node to be about the same voltage level as said first supply voltage while a voltage difference between said output node and said second supply voltage does not exceed a limit voltage, and which otherwise controls voltage of said control node to prevent said voltage difference from exceeding said limit voltage.

2. The adaptive charge pump of claim 1, wherein:
   said second supply voltage has a reference voltage level and wherein said first supply voltage has a positive supply voltage level;
   wherein said first conductivity type is N-type and wherein said second conductivity type is P-type; and
   wherein said output node has a voltage level which is twice the voltage level of said first supply voltage up to said limit voltage, and wherein said output node is held at said limit voltage when said first supply voltage is greater than half of said limit voltage.

3. The adaptive charge pump of claim 1, wherein:
   said first supply voltage has a reference voltage level and wherein said second supply voltage has a positive supply voltage level;
   wherein said first conductivity type is P-type and wherein said second conductivity type is N-type; and
   wherein said output node and said second supply voltage have a common magnitude with opposite polarity when said second supply voltage is less than or equal to half of said limit voltage, and wherein said output node has a voltage level of said second supply voltage minus said limit voltage when said second supply voltage is greater than half of said limit voltage.

4. The adaptive charge pump of claim 1, wherein said controller comprises:
   a fifth transistor of said second conductivity type having a first current terminal receiving said first supply voltage, having a control terminal coupled to a fifth node and having a second current terminal coupled to said control node;
   a sixth transistor of said second conductivity type having a first current terminal receiving said first supply voltage and having a second current terminal and a control terminal coupled together at said fifth node;
   a current device coupled between said first supply voltage and a sixth node;
   a seventh transistor of said first conductivity type having a first current terminal coupled to said fifth node, having a control terminal coupled to said sixth node and having a second current terminal coupled to a seventh node;
   an eighth transistor of said first conductivity type having a first current terminal coupled to said seventh node, having a control terminal coupled to an eighth node and having a second current terminal receiving said second supply voltage;
   a ninth transistor of said first conductivity type having a first current terminal and a control node coupled together at said eighth node, and having a second current terminal receiving said second supply voltage;
   a resistor coupled between said sixth and eighth nodes; and
   a Zener diode coupled between said output node and said seventh node.

5. The adaptive charge pump of claim 4, further comprising a smoothing capacitor coupled between said first supply voltage and said control node.

6. The adaptive charge pump of claim 4, wherein said fifth transistor is significantly larger than said sixth transistor, wherein said current device and said resistor are configured to operate said seventh transistor in saturation, and wherein said eighth and ninth transistors are in a current mirror configuration.

7. The adaptive charge pump of claim 4, wherein:
   said second supply voltage has a reference voltage level and wherein said first supply voltage has a positive supply voltage level;
   wherein said first conductivity type is N-type and wherein said second conductivity type is P-type;
   wherein said Zener diode has an anode coupled to said seventh node and a cathode coupled to said output node; and
   wherein said current device sources current into said sixth node.

8. The adaptive charge pump of claim 4, wherein:
   said first supply voltage has a reference voltage level and wherein said second supply voltage has a positive supply voltage level;
   wherein said first conductivity type is P-type and wherein said second conductivity type is N-type;
   wherein said Zener diode has an anode coupled to said output node and a cathode coupled to said seventh node; and
   wherein said current device sinks current from said sixth node.

9. An electronic device, comprising:
   a supply input receiving a regulated voltage and a reference input receiving a reference voltage;
   a voltage rail; and
   a charge pump coupled between said supply and reference inputs and having an output terminal coupled to said voltage rail, wherein said charge pump drives said voltage rail to twice the voltage level of said regulated voltage up to a limit voltage level, wherein said charge pump comprises:

first and second nodes which are toggled to opposite states between said regulated and reference voltages;
a first capacitor coupled between said first node and a third node, a second capacitor coupled between said second node and a fourth node, and a third capacitor coupled between said reference input and said output terminal;
a first N-type transistor having current terminals coupled between a control node and said third node and having a control terminal coupled to said fourth node;
a second N-type transistor having current terminals coupled between said control node and said fourth node and having a control terminal coupled to said third node;
a first P-type transistor having current terminals coupled between said third node and said output terminal and having a control terminal coupled to said fourth node;
a second P-type transistor having current terminals coupled between said fourth node and said output terminal and having a control terminal coupled to said third node; and
a controller which controls said control node to be about the same voltage level as said regulated voltage while a voltage difference between said output terminal and said reference voltage does not exceed said limit voltage level, and which otherwise controls voltage of said control node to prevent said voltage difference from exceeding said limit voltage level.

10. The electronic device of claim 9, further comprising:
a regulator providing said regulated voltage relative to said reference voltage;
wherein said voltage rail, said control node and said charge pump are integrated on a chip including said supply and reference inputs; and
a processor and a memory coupled together via an interface and receiving said regulated and reference voltages from said regulator.

11. The electronic device of claim 9, wherein said controller comprises:
a third P-type transistor having current terminals coupled between said supply input and said control node and having a control terminal coupled to a fifth node;
a fourth P-type transistor having current terminals coupled between said supply input and said fifth node and having a control terminal coupled to said fifth node;
a current device sourcing current from said supply input to a sixth node;
a third N-type transistor having current terminals between said fifth node and a seventh node and having a control terminal coupled to said sixth node;
a fourth N-type transistor having current terminals coupled between said seventh node and said reference input and having a control terminal coupled to an eighth node;
a fifth N-type transistor having current terminals coupled between said eighth node and said reference input and having a control terminal coupled to said eighth node;
a resistor coupled between said sixth and eighth nodes;
a fourth capacitor coupled between said supply input and said control node; and
a Zener diode having an anode coupled to said seventh node and having a cathode coupled to said output terminal.

12. The electronic device of claim 11, wherein said third P-type transistor is significantly larger than said fourth P-type transistor, wherein said current device and said resistor are configured to operate said third N-type transistor in saturation, and wherein said fourth and fifth N-type transistors are in a current mirror configuration.

13. An electronic device, comprising:
a supply input receiving a regulated voltage and a reference input receiving a reference voltage;
a voltage rail; and
a charge pump coupled between said supply and reference inputs and having an output terminal coupled to said voltage rail, wherein said charge pump drives said voltage rail to about the same voltage level of said regulated voltage with opposite polarity up to a threshold voltage level, wherein said charge pump comprises:
first and second nodes which are toggled to opposite states between said regulated and reference voltages;
a first capacitor coupled between said first node and a third node, a second capacitor coupled between said second node and a fourth node, and a third capacitor coupled between said reference input and said output terminal;
a first P-type transistor having current terminals coupled between a control node and said third node and having a control terminal coupled to said fourth node;
a second P-type transistor having current terminals coupled between said control node and said fourth node and having a control terminal coupled to said third node;
a first N-type transistor having current terminals coupled between said third node and said output terminal and having a control terminal coupled to said fourth node;
a second N-type transistor having current terminals coupled between said fourth node and said output terminal and having a control terminal coupled to said third node; and
a controller which controls said control node to be about the same voltage level as said reference voltage while a voltage difference between said output terminal and said regulated voltage does not exceed twice said threshold voltage level, and which otherwise controls voltage of said control node to prevent said voltage difference from exceeding twice said threshold voltage level.

14. The electronic device of claim 13, further comprising:
a regulator providing said regulated voltage relative to said reference voltage;
wherein said voltage rail, said control node and said charge pump are integrated on a chip including said supply and reference inputs; and
a processor and a memory coupled together via an interface and receiving said regulated and reference voltages from said regulator.

15. The electronic device of claim 13, wherein said controller comprises:
a third N-type transistor having current terminals coupled between said reference input and said control node and having a control terminal coupled to a fifth node;
a fourth N-type transistor having current terminals coupled between said reference input and said fifth node and having a control terminal coupled to said fifth node;
a current device sourcing current from a sixth node to said reference input;
a third P-type transistor having current terminals between said fifth node and a seventh node and having a control terminal coupled to said sixth node;
a fourth P-type transistor having current terminals coupled between said seventh node and said supply input and having a control terminal coupled to an eighth node;

a fifth P-type transistor having current terminals coupled between said eighth node and said supply input and having a control terminal coupled to said eighth node;

a resistor coupled between said sixth and eighth nodes;

a fourth capacitor coupled between said reference input and said control node; and a Zener diode having a cathode coupled to said seventh node and having an anode coupled to said output terminal.

16. The electronic device of claim 15, wherein said third N-type transistor is significantly larger than said fourth N-type transistor, wherein said current device and said resistor are configured to operate said third P-type transistor in saturation, and wherein said fourth and fifth P-type transistors are in a current mirror configuration.

17. A method of adaptively controlling a charge pump, comprising:

coupling the charge pump to a control node;

toggling a clock input of the charge pump between supply voltage levels to charge an output of the charge pump;

monitoring the output of the charge pump;

when a supply voltage magnitude is less than or equal to a threshold level, maintaining the control node at a supply voltage level; and when the supply voltage magnitude exceeds the threshold level, adjusting the control node to maintain the output of the charge pump at a limit level.

18. The method of claim 17, wherein:

said toggling a clock input of the charge pump comprises charging the output of the charge pump to twice the supply voltage level; and wherein said adjusting the control node comprises decreasing a magnitude of the control node by about the same amount as the supply voltage magnitude exceeds the threshold level.

19. The method of claim 17, wherein:

said toggling a clock input of the charge pump comprises charging the output of the charge pump to have about the same magnitude with opposite polarity as the supply voltage level; and wherein said adjusting the control node comprises increasing a magnitude of the control node to about twice the amount as the supply voltage level exceeds the threshold level.

20. The method of claim 17, further comprising:

developing a control current through a control device coupled between a supply voltage node and the control node;

when the supply voltage magnitude is less than or equal to the threshold level, maintaining the control current at a fixed level; and when the supply voltage magnitude exceeds the threshold level, adjusting the control current to adjust the control node.

* * * * *